3 Sheets - Sheet 1
W. S. Loughborough
Machine for Composing or Setting Type
No. 339.
Reissued Jan. 8. 1856.
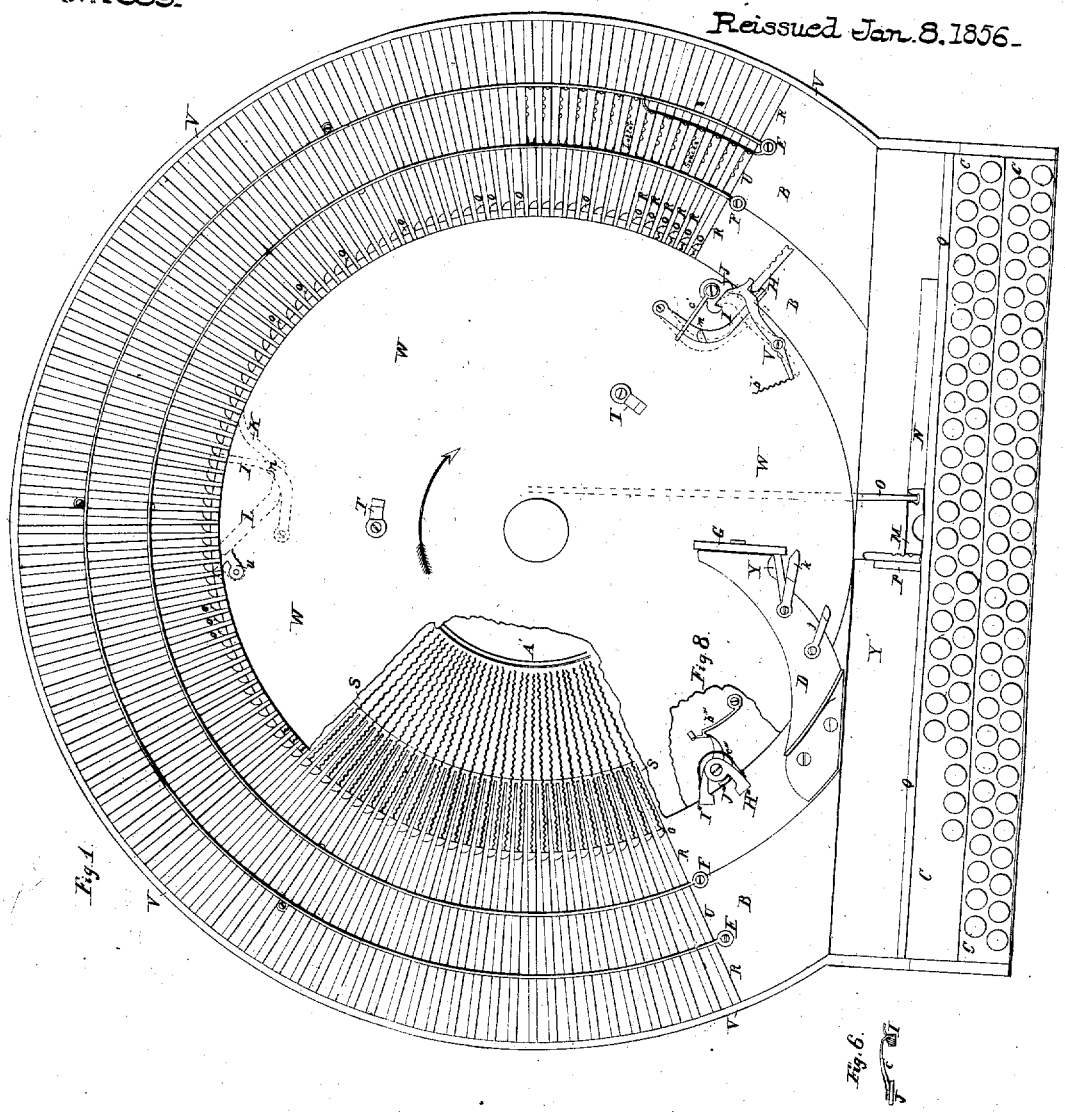

3 Sheets - Sheet 2.
W. S. Loughborough.
Machine for Composing or Setting Type.
No. 339.
Reissued Jan. 8, 1856.
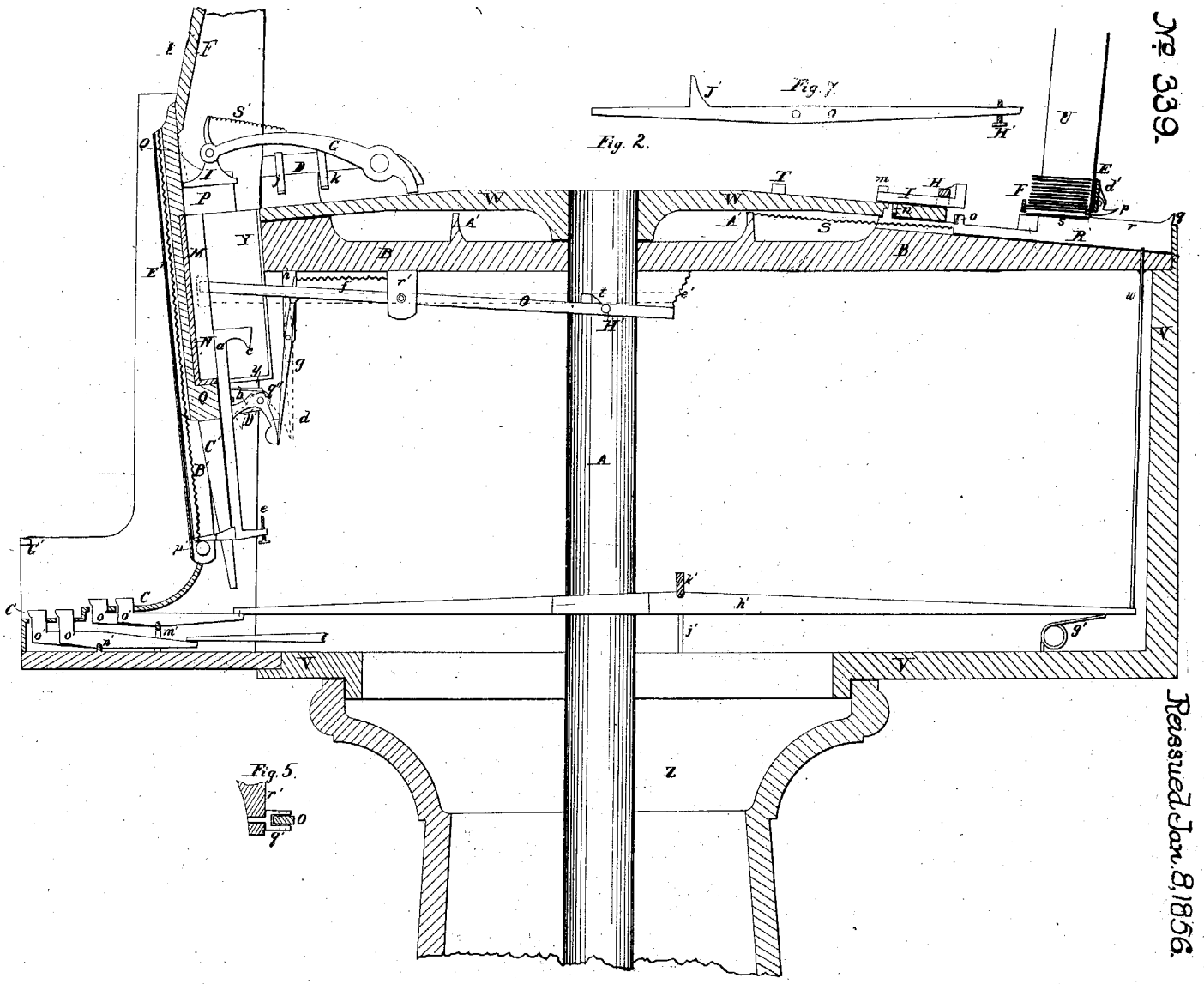

3 Sheets - Sheet 3
W. S. Loughborough.
Machine for Composing or Setting Type.
No. 339.
Reissued Jan. 8, 1856.
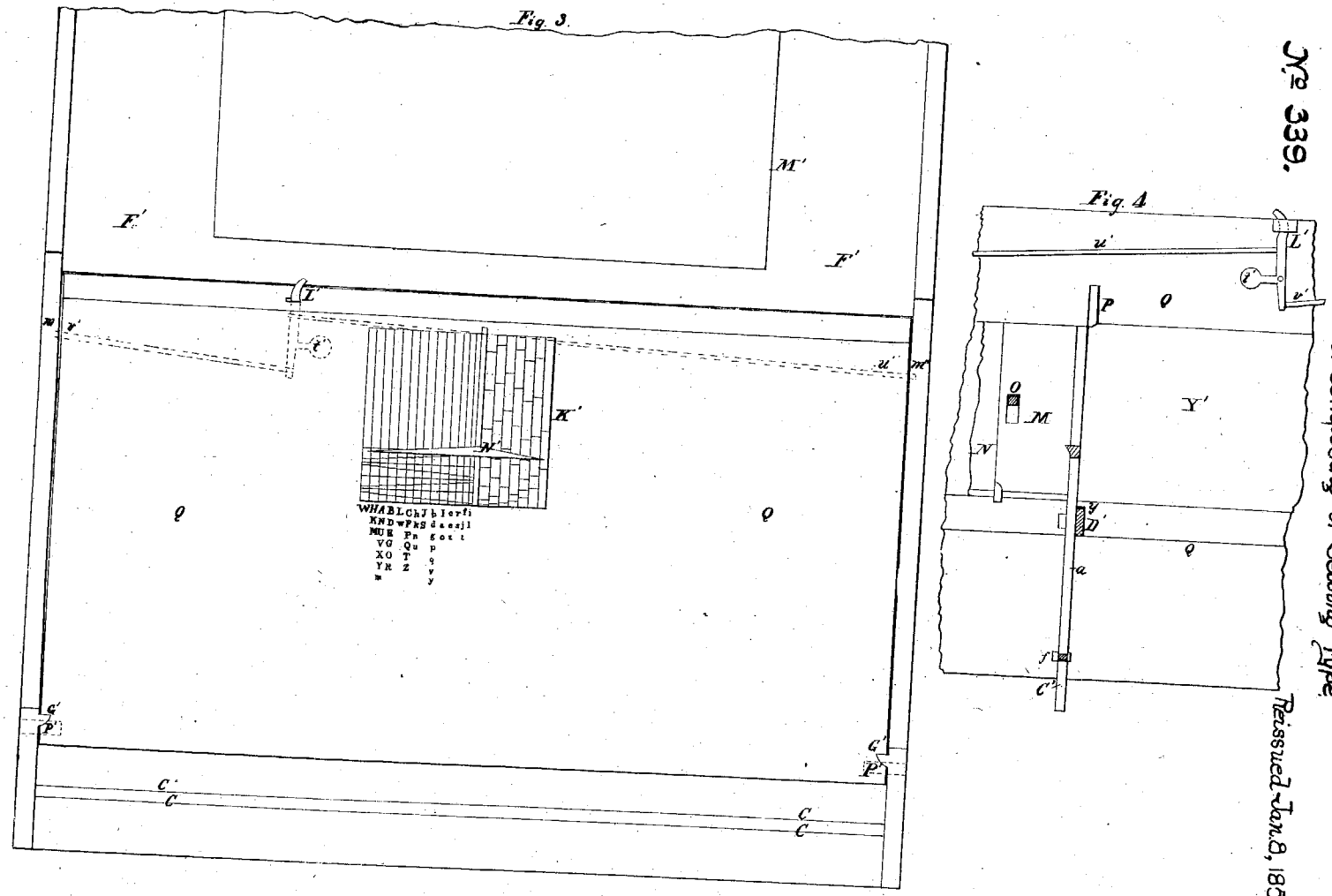

UNITED STATES PATENT OFFICE.

W. S. LOUGHBOROUGH, OF ROCHESTER, NEW YORK.

MACHINE FOR COMPOSING AND SETTING TYPES.

Specification forming part of Letters Patent No. 13,710, dated October 23, 1855; Reissue No. 339, dated January 8, 1856.

*To all whom it may concern:*

Be it known that I, WM. S. LOUGHBOROUGH, of Rochester, in the county of Monroe and State of New York, have invented a new and useful machine for setting types, whereby the operator is enabled to do the entire business of composing types by working the keys of an ordinary key-board; and I do hereby declare that the following is a full and exact decription of the construction and operation of the same, reference being had to the accompanying drawings making a part of this specification, in which—

Figure 1 is a plan of the upper face of the composing-wheel W, &c., and showing the respective locality and arrangement of the key-board C, galley or composing-chamber N, type cells U, bridge D, &c. Fig. 2 is a transverse section showing the inclined position of the type-cells U, bed-plate Q, the arrangement of the lever G and its head *i*, the devices for effecting the delivery of the types from the cell of j's, the justifying-bar *a* and its fixtures, the lever O, detent G, and the action of the keys, &c. Fig. 3 is a perpendicular view of the front, showing the respective position of the manuscript M′, needle or index N′, index-plate K′, bed-plate Q, and the key-board C. Fig. 4 is a view of a section of the reverse side of Fig. 3, showing the catches *u′ v′*, which keep the bed-plate Q in its upright position, the rule M, the galley N, justifying-bar *a*, and the cap Y of the galley.

The nature of my invention consists in the construction of a machine for setting types which shall admit of a whole font, and the parts being so constructed and arranged as to prevent the slightest possibility of confusion in the composition or of delay in the transmission of the types from their respective cells to the galley, and which is effected so instantaneously that the operator may touch the key for an a or b immediately after touching for a y or z, or any other letter near either end of the alphabet, and yet they will be deposited in the line in the order in which their respective keys were touched; and by means of the indicator the justifying is carried on with the greatest possible precision.

I propose to use a cast-iron shell column, Z, Fig. 2, for the foundation of the machine, of sufficient length to elevate the key-board to a convenient height for the operator. On the top of this column is a drum or cylinder, V, from six to ten inches deep, and with a diameter exceeding that of the composing-wheel W by about six and a half to seven inches. The base-plate B of the type-cells rests on this cylinder. Said plate is inclined toward the center on its upper face for about four and a half inches from its circumference, as seen in Fig. 2. This inclination may be ten degrees, more or less, but that of the type-cells and plate Q must be arranged to correspond therewith. The object of the inclination of these is to keep the types properly adjusted in the cells and also in the galley. A segment of B and V is removed from the front side so as to bring the galley N up to the wheel W.

The type-cells U of the several cases in the font, are placed upon the base-plate B at intervals of one-quarter of an inch or less in the circle U, Fig. 1. They are constructed of thin sheet metal, with one edge open, (seen at U, Fig. 2.)

There is a band, F, fixed to the plate B, which passes round in front of the cells, or between them and the composing-wheel, and another, E, on the outside. Each cell is fitted in its appropriate place to these bands, which keep them properly adjusted at the bottom, and their tops rest in a rack.

Directly under each cell is a slide, R, operating in a groove formed in the plate B, which admits of a centripetal and centrifugal movement of one and one-sixteenth inch. The slides should be as thick as the width of the body of the types to be used in the machine, and each should be so fitted to its respective cell as to deliver but one type at once, which is done by making the blank elevation *r* of the slides to correspond to the thickness of the types in its cell; and the opening at the lower edge of the front band, F, must also agree with the thickness of the types contained in the cells opposite each. This band F should be faced with india-rubber, or an equivalent, next to the cells, to prevent the face of the types from being marred or injured.

There is a spring, S, Figs. 1 and 2, extending from the ring A′ to each slide, with which they are connected. Said springs are distended when the slides are in their proper position under the cells, where they are retained by the detents *w* until said detents are drawn out by touching the keys.

The composing-wheel W is constructed, as seen in Fig. 2, with an inclination toward its center for three inches from the periphery, which inclination must also agree with that of the type-cells.

There are cam-grooves in the lower face of the wheel under each transit, said transit being composed of the jaws H and I. Their shape is shown by the red dotted lines in Fig. 1 at L and K, where the entrance-groove K approaches more directly toward the center of the wheel than the discharge-groove L. They open from and into its periphery, and receive the tooth *o* of the slides R when the keys are touched.

The type bearers or transits are constructed with two jaws, H and I, each having a different axis, that of H being near the periphery and preceding the entrance-groove, and that of I being about one inch from the periphery and following about the same distance from the angle in the grooves. The jaw H is constantly pressed out by the spring *b'*, but the stop J permits the change shown by the dotted lines, as at the instant of delivering a type. There is a recess across the under side of H, through which I passes, and one shoulder of this recess limits the opening of I. The spring *c'* is constructed, as seen in Fig. 6, for the purpose of securing the jaw I at either extreme of being open or closed. *n* is a tappet fixed to of the jaw I, and hangs in the angle of the groove, which brings it in a line with the mouth or jaws of the transit H and I, and the slides R, and is drawn out by the cog or tooth *o*, bringing the jaw with it and closing upon the type. The tappet *m* is fixed to the upper side of the same jaw, and opens it for the delivery of atype by striking the adjuster *k*, which changes the pressure of the spring *c'* to the opposite bevel, and holds it open until the tooth of a slide shall close it again. The jaw H is opened at the same instant by the adjuster *j* striking the tappet *v*. The object of placing *v* so near the axis of H is to produce the greatest possible change at its extreme end by the slightest touch of the adjuster *j*. The face of the jaws where they grasp the types should be about three-eighths of an inch vertically by three-sixteenths of an inch horizontally. They should also be faced with some elastic substance. These transits may be constructed as seen in Fig. 8, where both jaws have a common axis. The jaw I''' is thrown open by the adjuster *k*, which should be hung to suit this construction of the transits, striking the spur of the jaw, and it is held open by the rook of the spring *b'''* catching the spur. The end of said spring is turned down through the opening in the face of the wheel, and hangs in the angle of the groove, similar to *n*, on the jaw I, but the tooth of a slide, when delivering its type, instead of drawing the spring out, throws it toward the center of the wheel, which unhooks it from the spur of the jaw I''', and the spring *c'''* causes said jaw to grasp the type. This spring acts upon both jaws. The stop J''' keeps the jaw H''' properly adjusted for the reception of a type as the wheel revolves. The jaw H''' may be opened simultaneously with the other by the adjuster *j*, but is thrown back by the spring *c'''* immediately after passing *j*.

The groove K is curved at its entrance in order to prevent a concussion, which might otherwise occur by the tooth *o* striking too suddenly against its side. The discharge-groove L may also be curved so as to bring it on about the same angle with the slides at all points as they pass out.

It may be found expedient to close the entrance-groove as soon as the transit shall have received a type, to prevent any other slide from entering until the type already received shall have been delivered, which may be done by applying a slide to the periphery of the wheel and connecting it with the jaw I, so that when the jaw is open the groove shall be also, and vice versa.

The discharge-groove L may be closed at all times, except when the tooth of a slide passes out, by applying a spring to close it, and the pressure from the tooth of the receding slide shall open it.

It will be observed that the end of the slides when thrown out are one-eighth of an inch from the wheel, the object of which is that when the detent *w* is drawn out the spring S may bring the slides in that one-eighth of an inch, which prevents the detent from reentering the notch, in which case that type would have been omitted in the composition if a transit did not happen to be opposite at the very instant the key was touched.

The cam *u*, Fig. 1, is turned upon its axis by the pressure from the tooth *o* as it passes out, and when thus turned it reaches one-eighth of an inch beyond the periphery of the wheel, thereby forcing the slide back to its place, or the same may be effected by means of a simple projection from the edge of the wheel.

The bridge or rest D is bolted to the base plate B, and supports the vibrating-lever G, which has a positive and uniform vertical motion received from the tappets T on the face of the wheel, the spring Y giving the counter motion, and as often as a transit passes the point of delivery, said point being at the guard-plate P, Figs. 1, 2, and 4.

The spring *s'* keeps the lower face of the head *i* parallel with the types as it presses them down in the line by forcing the point at the bottom against the plate Q. (Seen in Fig. 2.) Another construction and application of this head is to fix a dovetail tenon on its reverse side, and a corresponding groove in the plate P for said tenon to move in vertically the type, fix the spring *s'* to the plate Q and head *i*, as shown by the dotted line, and let the lever G rest on a pivot at the present axis of *i*.

The composing chamber or galley N, Figs. 1, 2, and 4, into which the types are set, I construct in the usual form, except the elevation on the side, which is only about one-third as high as the length of the types.

The bed-plate Q extends across the machine in front and directly over the key-board. It hangs on the pivots P′, and is kept in its upright position by the catches *u′ v′*, each dropping into a notch in the sides *m″*, Fig. 3. Said catches are withdrawn when the justifying requires a change of the spacing, or when the galley is to be removed, by pressing the thumb-piece L′, when it may be swung down to its horizontal position, where it rests on the points G′.

There is a recess formed in this plate from end to end for the galley N to slide in. The arm C′ is connected with the heavy portion of this plate, and supports the justifying-bar *a*, Figs. 2 and 4.

The rod E′, Fig. 2, carries the needle or index N′ over the index-plate K′, Fig. 3. The spring B′ is attached to the cross-head *f* of the justifying-bar *a*, between it and E′.

The cam-ratch *b* is constructed and applied, as seen in Fig. 2, so as to allow the bar *a* to move down or recede according to the thickness of each type or space deposited by the transits H and I, and to prevent it from returning until the line shall be filled, when the point *c* strikes the ratch *b* near its axis, and changes it to the position of the dotted lines, thus throwing the spring *y* into the notch *q″*, which holds it there until the bar *a* is thrown up by the spring B′, which is done as soon as the galley is moved forward so as to clear the bar *a*, and the set-screw *e*, when the bar rises, strikes the ratch *b*, and throws it back again when the spring *f′*, through the detent *g*, presses it down on the bar.

The lever O rests in the swivel *q′*, Fig. 5, which admits of its horizontal and vertical changes by the lever turning on the pin in the swivel and that turning in the hanger *r′*, or the lever may be made to swing vertically in the hanger, and that to turn in the plate B. Fig. 7 is a plan of the lever O, showing the set-screw H′, which receives the strokes from the tappets *t*, and by which the change of the line-register M is gaged.

The depressing-face of the tappets *t* (shown by the diagonal line) throws the opposite end of the lever O up immediately after making the horizontal change, when the tooth or spur of the detent *g* catches under the projection J′, thereby preventing another virbration until the next line shall be filled, when the arm *d* throws the detent *g* in the position of the dotted lines, thus relieving the lever O, and the spring *e′* brings it up horizontally, as shown by the dotted lines, and the tappet strikes the screw H′, forcing it out from the shaft, and the opposite end of the lever carries the line-register M forward, the depressing-face of the tappet forces the lever back to its inclined position, where it is caught and held by the detent *g*, as before shown. These tappets must be so arranged as to be ready to make the changes above described immediately after a transit passes the point of delivery, but said change being consequent upon the completion of a line in the composition, the action of the tappets *t* is rendered very irregular as to time.

The small j's cannot be delivered from the cell in the same manner as the other types, because the dot or spur extends beyond the body of the type, and that of each hooks over the end of the one next below it as they lie in the cell; but this difficulty is obviated by applying the detent *p*, Fig. 2. The spring *d′* holds it in so as to prevent the column of types from settling onto the slide, leaving a space for one type above the elevation *r*. As the slide is drawn in, the tappet *q* presses up the arm of the detent *p*, thereby removing the pressure from the lower type, and the column settles the thickness of one, and when the slide returns the detent again prevents their settling, except the one which passed below the point of the detent, and that drops on the plane *s* of the slide, ready for the next delivery.

The detent *p′* and spring *d′* are fixed to the band E.

The same application must be made to several of the cells in the case of italics.

The cells containing the spacing are brought in as far as the difference in their length and that of the body of the types, as seen at &, Fig 1, so as to effect their delivery from the slides to the transits. I propose to use pivot-keys in order to bring them into the smallest practicable compass. Those of the "lower-case," spacing, punctuation-points and figures are arranged on the first grade of the key-board, the spacing to the right hand, the alphabet next, and occupying both rows of keys alternately, those of the capitals, large and small, on the next grade, a little above and farther back, and the italics and italic capitals on the last, making three grades in the key-board for a whole font, and each distinct from the others. This arrangement brings the keys of the types most in request nearest at hand.

The "action" of the keys is shown in Fig. 2. *h′* is the lever which connects the keys *o′* with the detent *w*. The spring *g′* presses the detent up, or there may be a counter-balance on the opposite end of the levers *h′*. The rest *k* of the levers runs circularly, so as to bring the fulcrum of each equidistant from its key, and the detent. It is supported by occasional stanchions, *j*. The rest *m′* is similarly supported, but runs straight. The rest *n′* lies on the base of the key-board.

The cap Y′ protects the face of the types in the galley and keeps them properly adjusted when the galley is being transferred. Its position in the machine is stationary and on the left hand of the guard-plate P.

The galley is placed with its left end, as it lies in the machine, up to the guard-plate, and as the lines are filled in it is moved back in the cap, as before shown.

The upper bearing of the shaft A is in the base-plate B, and the lower one is in the bottom of the column Z. It may be driven by a "bevel-gear," or other device, connected near the lower end.

A machine to admit or receive a whole font of types should have a composing-wheel from eighteen to twenty-two inches in diameter, or larger, if desired, which brings the largest machines within the compass of three feet.

*Summary of the operation.*—The types are placed in their respective cells with their face or lettered end out and the nicked side to the left as they stand in the machine. The manuscript is placed as seen at M, Fig. 3. The operator now reads a line or sentence, touches the key for a space, then for a capital letter, and then for a small one, and so on, making his selection, as in the case of setting into a "stick," simply by touching the keys, and every letter, space, &c., is deposited in the composition as he shall direct, and without delay or confusion. He sees at a glance, from the position of the needle or index, the precise point to which the line is filled, and the graduated scales on the right show what spacing is required to fill out the line from any point, and those on the left show what letters will be admitted in the line from any point, which enables him to do the justifying with even greater precision and dispatch than when setting in a "stick." When he sees that the spacing must be changed, he swings the bed-plate Q down over the key-board, makes the necessary change, readjusts it, and proceeds. For convenience at such times, he may have a small case of spacing at hand. When a key is touched, the detent *w* is drawn out and the tooth *o* of the slide enters the groove K, and the type is delivered to the transit, when the discharge-groove L and the cam *u* throws the slide back to its place, and the type is conveyed to the point of delivery, where it is deposited in the angle of the justifying-bar *a* and guard-plate P. The head *i* presses it down in the line, the bar *a* recedes according to its thickness, whether thick or thin, and so on, until the line is filled, when the galley is thrown forward by the line-register M the depth of the line, relieving the bar *a*, and it flies back to its place, carrying the needle or index N′ up to the top of the plate K′ ready to commence the next line. When the galley is filled or an article finished, it may be transferred.

When a cell is emptied, it may be removed and filled; or, if desirable, there may be two sets of cells, that one may be filled while the other is in the machine.

What I claim as my invention, and desire to secure by Letters Patent of the United States, is—

1. The composing-wheel W, as herein specified, and for the purposes set forth.

2. The means above described for delivering the types from the various cells to the jaws of transits, or their equivalents, fixed to a wheel or other rotary apparatus.

3. The construction and application of the transits, as described, or their equivalents, attached to a wheel or other rotary motion, to convey the types from the slides or their equivalents to the galley or composing-chamber.

4. The devices for effecting the delivery of the types from the cell of small j's and those cells which are similarly conditioned in the case of italics.

5. The construction and arrangement of the lever G and its head *i*, as described, and for the purpose set forth.

6. The construction and arrangement of the justifying bar *a*, in combination with the cam-ratch *b*.

7. The index N′, fixed to the bar *a*, by which it is operated, in combination with the index-plate K′.

8. The application of the detent *g*, operating as described.

9. The construction and arrangement of the lever O, in combination with the "rule" or line-register M, as described.

10. The tappet *t*, constructed as described, so as to effect the horizontal and vertical changes of the lever O.

11. The detents *w*, so applied as to retain the slides R when they are thrown back after delivering a type.

WM. S. LOUGHBOROUGH.

Witnesses:

WM. M. FERGUSON,
J. H. GODDARD.